(12) United States Patent
Yang et al.

(10) Patent No.: US 9,745,437 B2
(45) Date of Patent: Aug. 29, 2017

(54) METHOD FOR THE PREPARATION OF MICROCELLULAR POLYURETHANE ELASTOMERS

(71) Applicant: SKC Co., Ltd., Gyeonggi-do (KR)

(72) Inventors: Jae Soo Yang, Ulsan (KR); Hee Young Choi, Ulsan (KR); Jeongmoo Kim, Ulsan (KR); Joon Mo Lee, Ulsan (KR)

(73) Assignee: SKC Co. Ltd., Suwon-si, Gyeonggii-do (KR)

( * ) Notice: Subject to any disclaimer, the term of this patent is extended or adjusted under 35 U.S.C. 154(b) by 484 days.

(21) Appl. No.: 14/369,011

(22) PCT Filed: Dec. 27, 2012

(86) PCT No.: PCT/KR2012/011573
§ 371 (c)(1),
(2) Date: Jun. 26, 2014

(87) PCT Pub. No.: WO2013/100633
PCT Pub. Date: Jul. 4, 2013

(65) Prior Publication Data
US 2014/0374976 A1 Dec. 25, 2014

(30) Foreign Application Priority Data

Dec. 27, 2011 (KR) .................. 10-2011-0143772

(51) Int. Cl.
| | | |
|---|---|---|
| *C08J 9/00* | (2006.01) | |
| *C08G 18/76* | (2006.01) | |
| *C08G 18/78* | (2006.01) | |
| *C08G 18/18* | (2006.01) | |
| *C08G 18/42* | (2006.01) | |
| *C08G 18/32* | (2006.01) | |
| *F16F 1/36* | (2006.01) | |
| *C08G 18/10* | (2006.01) | |
| *B60G 11/22* | (2006.01) | |
| *C08G 101/00* | (2006.01) | |

(52) U.S. Cl.
CPC ............. *C08J 9/0028* (2013.01); *B60G 11/22* (2013.01); *C08G 18/1833* (2013.01); *C08G 18/3206* (2013.01); *C08G 18/4277* (2013.01); *C08G 18/7678* (2013.01); *C08G 18/7837* (2013.01); *F16F 1/3605* (2013.01); *C08G 18/10* (2013.01); *C08G 2101/0008* (2013.01); *C08G 2101/0066* (2013.01); *C08G 2101/0083* (2013.01); *C08G 2350/00* (2013.01)

(58) Field of Classification Search
CPC .................................................. C08G 18/7837
See application file for complete search history.

(56) References Cited

U.S. PATENT DOCUMENTS

| | | | |
|---|---|---|---|
| 4,334,033 A | 6/1982 | Metzinger et al. | |
| 4,526,906 A | 7/1985 | Wegner | |
| 6,310,114 B1 | 10/2001 | Genz et al. | |
| 2002/0123594 A1 | 9/2002 | Hoffmann et al. | |
| 2008/0038461 A1* | 2/2008 | Lekovic ................ | C08G 18/10 427/230 |
| 2009/0127921 A1 | 5/2009 | Krause | |
| 2010/0260956 A1 | 10/2010 | Lehmann | |
| 2011/0118373 A1 | 5/2011 | Prissok et al. | |

FOREIGN PATENT DOCUMENTS

| | | |
|---|---|---|
| JP | 07-224139 A | 8/1995 |
| JP | H11-512465 A | 10/1999 |
| JP | 2000-063473 A | 2/2000 |

OTHER PUBLICATIONS

Extended European Search Report from corresponding European Patent Application No. 12863275.9 received Nov. 2, 2015.
International Search Report and Written Opinion for Application No. PCT/KR2012/011573 dated Apr. 29, 2013.
Office Action from corresponding European Patent Application No. 12863275.9 dated Oct. 5, 2016.
Office Action from corresponding Japanese Patent Application No. 2014-550011, mailed Aug. 16, 2016.

* cited by examiner

*Primary Examiner* — Melissa Rioja
(74) *Attorney, Agent, or Firm* — Alston & Bird LLP

(57) ABSTRACT

This invention relates to a method of preparing a microcellular polyurethane elastomer by reacting naphthalene diisocyanate with a polyol to prepare a prepolymer containing an isocyanate (NCO) group, followed by mixing the prepared polyurethane prepolymer with a plasticizer, water, an emulsifier and the like, and then foaming the prepolymer blend to prepare a polyurethane elastomer, wherein the emulsifier is a mixture of (a) a compound selected from the group consisting of 2,4-toluene diisocyanate, 2,6-toluene diisocyanate, 2,4-diphenylmethane diisocyanate, 4,4'-diphenylmethane diisocyanate, hexamethylene diisocyanate, 1,4'-cyclohexane diisocyanate and mixtures thereof, and (b) a $C_{2-10}$ hydrocarbon having a molecular weight of 500 or less with two to four hydroxyl groups, or mixtures thereof. The method of the invention can optimize the viscosity and properties of the prepolymer resulting from the reaction of naphthalene diisocyanate with a polyol, thus improving processability.

19 Claims, No Drawings

METHOD FOR THE PREPARATION OF MICROCELLULAR POLYURETHANE ELASTOMERS

FIELD OF THE INVENTION

The present invention relates to a method of preparing microcellular polyurethane elastomers, and, more particularly, to a method of preparing a polyurethane elastomer suitable for use in helper springs for bicycles, motorcycles, automobile suspension devices, furnitures or high-vibrating matrixes.

BACKGROUND OF THE INVENTION

Due to superior vibration damping and impact absorption properties as well as excellent dynamic characteristics under high loads, durability and permanent deformation resistance, polyurethane elastomers having a microcellular structure have been extensively used in helper springs for bicycles, motorcycles, automobile suspension devices, furnitures or high-vibrating matrixes. In particular, as polyurethane elastomers prepared by using naphthalene diisocyanate (NDI) have superior bending fatigue resistance, they are widely applied in cases where high durability is required, such as in helper springs for bicycles, motorcycles, automobile suspension devices, furnitures or high-vibrating matrixes.

Typical polyurethane elastomers are prepared by reacting a polyol with a diisocyanate-based material. Conventional methods of preparing polyurethane elastomers with using NDI are performed by, for example, reacting NDI alone, or in combination with 4,4-diphenylmethane diisocyanate (p-MDI), with a polyol to prepare a polyurethane prepolymer containing a terminal isocyanate (NCO) group, followed by mixing the prepared polyurethane prepolymer containing a terminal NCO group with water, a catalyst, a surfactant, an antioxidant, a chain extender, etc. to obtain a prepolymer blend, and then foaming the prepolymer blend with a foaming machine to prepare a polyurethane elastomer.

In addition, as disclosed in U.S. Pat. No. 4,334,033, a method of preparing a polyurethane elastomer includes 1) reacting toluene diisocyanate (TDI) with polyethylene glycol to form a hydroxyl-terminal prepolymer, followed by reacting the prepolymer with NDI to prepare a polyurethane prepolymer having a terminal NCO group; and 2) then reacting the hydroxyl-terminal prepolymer and the polyurethane prepolymer having a terminal NCO group with butanediol to obtain a polyurethane elastomer.

However, in the case where NDI alone is reacted with a polyol, since the prepolymer thus prepared has a short shelf life and high viscosity, it requires operation at a high temperature of at least 100° C., thereby undesirably making it difficult to handle feeds. Also, when p-MDI or TDI is additionally used to solve this problem, the properties of a polyurethane elastomer is deteriorated due to the structural feature of p-MDI or TDI. Therefore, there is a need to develop polyurethane elastomers having improved viscosity and superior properties.

SUMMARY OF THE INVENTION

Accordingly, an object of the present invention is to provide a method of preparing a microcellular polyurethane elastomer, which comprises introducing an emulsifier that is a mixture of (a) a compound selected from the group consisting of 2,4-toluene diisocyanate, 2,6-toluene diisocyanate, 2,4-diphenylmethane diisocyanate, 4,4'-diphenylmethane diisocyanate, hexamethylene diisocyanate, 1,4'-cyclohexane diisocyanate and mixtures thereof, and (b) a $C_{2-10}$ hydrocarbon having a molecular weight of 500 or less with two to four hydroxyl groups, or mixtures thereof, in order to optimize the viscosity and properties of a prepolymer resulting from the reaction of naphthalene diisocyanate with a polyol and to increase storage stability by suppressing phase separation of a hydrogen-containing composition containing an excess of water, thereby increasing processability of the method.

Another object of the present invention is to provide a helper spring for bicycles, motorcycles, automobile suspension devices, furnitures or high-vibrating matrixes prepared by using the polyurethane elastomer.

In order to accomplish the above objects, the present invention provides a method of preparing a microcellular polyurethane elastomer, comprising (i) reacting naphthalene diisocyanate (NDI) with a polyol to obtain a prepolymer containing an isocyanate (NCO) group; (ii) adding a plasticizer and an additional amount of naphthalene diisocyanate to the prepolymer prepared in step (i) to introduce into the prepolymer a terminal free isocyanate (NCO) group having 5 to 30 wt % of an allophanate structure, based on the weight of the prepolymer; and (iii) mixing the prepolymer having a terminal free isocyanate (NCO) group obtained in step (ii) with water and an emulsifier and then foaming the prepolymer blend to prepare a polyurethane elastomer.

The method of preparing a microcellular polyurethane elastomer in accordance with the present invention can optimize the viscosity and shelf life of a prepolymer resulting from the reaction of NDI and a polyol via a specific composition and reaction. Furthermore, due to the use of an emulsifier which is a mixture of (a) a compound selected from the group consisting of 2,4-toluene diisocyanate, 2,6-toluene diisocyanate, 2,4-diphenylmethane diisocyanate, 4,4'-diphenylmethane diisocyanate, hexamethylene diisocyanate, 1,4'-cyclohexane diisocyanate and mixtures thereof, and (b) a $C_{2-10}$ hydrocarbon having a molecular weight of 500 or less with two to four hydroxyl groups, or mixtures thereof, phase separation of a hydrogen-containing composition containing an excess of water as a chain extender can be suppressed, which increases processability of the method.

DETAILED DESCRIPTION OF THE INVENTION

Hereinafter, the present invention will be described in detail.

According to the present invention, a method of preparing a microcellular polyurethane elastomer includes (i) reacting naphthalene diisocyanate (NDI) with a polyol to prepare a prepolymer containing an isocyanate (NCO) group.

In step (i), the polyol influences the properties of a final microcellular polyurethane elastomer, and may be selected from the group consisting of polyester glycol, polyether glycol, polycarbonate glycol and polycaprolactone glycol. In particular, it is preferable to use polycaprolactone glycol that has excellent resistance to water, oil, solvent, chlorine and the like and is biodegradable to ensure eco-friendly properties.

The number average molecular weight (Mn) of the polyol is preferably 500 to 5,000, and more preferably 1,000 to 5,000. If the Mn is less than 500, the resulting microcellular polyurethane elastomer may show decreased flexibility, and thus easy to be broken. In contrast, if the Mn exceeds 5,000, the resulting microcellular polyurethane elastomer does not have sufficient hardness, and has high viscosity and is thus difficult to be handled. Particularly, in the case where this elastomer is applied to a helper spring for automobile suspension devices, sufficient strength cannot be ensured.

The molar ratio of NDI to polyol is 0.2 to 0.6:1, and preferably 0.3 to 0.5:1.

The amount of NCO contained in the prepolymer may be 2 to 15 wt %, and preferably 5 to 10 wt %.

After preparation of the prepolymer through step (i), the prepolymer is subjected to step (ii), which includes adding a plasticizer and an additional amount of naphthalene diisocyanate to the prepolymer prepared in step (i) to introduce into the prepolymer a terminal free isocyanate (NCO) group having 5 to 30 wt % of an allophanate structure, based on the weight of the prepolymer.

The prepolymer may contain a terminal free isocyanate (NCO) group having an allophanate structure, and the amount of the allophanate structure is preferably 5 to 30% based on the amount of the prepolymer.

The allophanate structure may be introduced by adding a plasticizer and an additional amount of NDI to the prepared prepolymer containing an NCO group.

In step (ii), the plasticizer is not particularly limited so long as it is typically usable in the preparation of polyurethane, and examples thereof may include diisobutyl phthalate, dioctyl phthalate, and diisononyl phthalate. The plasticizer may be added in an amount of 0.1 to 30 parts by weight, preferably 1 to 20 parts by weight, and more preferably 2 to 10 parts by weight, based on 100 parts by weight of the prepolymer.

The additional amount of NDI may be used in an amount of 1 to 40 parts by weight, preferably 2 to 35 parts by weight, and more preferably 5 to 25 parts by weight, based on 100 parts by weight of the prepolymer prepared in step (i).

After preparation of the prepolymer having a terminal free isocyanate group through steps (i) and (ii), the prepolymer is subjected to step (iii), which includes mixing the prepolymer having a terminal free isocyanate (NCO) group obtained in step (ii) with water and an emulsifier and then foaming the prepolymer blend to prepare a polyurethane elastomer.

In the above step, water may produce carbon dioxide ($CO_2$) by the reaction with NDI and thus functions as a foaming agent. In addition, water may form a cross-linked body having a urea bond due to the allophanate structure of the prepolymer, which may form a large area of crystallization, thus effectively improving heat resistance and mechanical properties, in particular, durability.

The amount of water to be mixed is preferably 20 to 95 parts by weight, more preferably 30 to 85 parts by weight, and most preferably 50 to 80 parts by weight, based on 100 parts by weight of the prepolymer.

However, if water is used in an excessively large amount, phase separation may undesirably occur due to the use of a surfactant.

Thus, in order to prevent such phase separation, the method of the present invention uses an emulsifier, which is a mixture of (a) a compound selected from the group consisting of 2,4-toluene diisocyanate, 2,6-toluene diisocyanate, 2,4-diphenylmethane diisocyanate, 4,4'-diphenylmethane diisocyanate, hexamethylene diisocyanate, 1,4'-cyclohexane diisocyanate and mixtures thereof, and (b) a $C_{2-10}$ hydrocarbon having a molecular weight of 500 or less with two to four hydroxyl groups, or mixtures thereof.

The emulsifier functions to prevent phase separation when a large amount of water is used, in addition to providing an emulsification function. Particularly in the process of preparing a microcellular polyurethane elastomer, when a prepolymer blend obtained by mixing the prepolymer, water, the emulsifier and so on contains an excess of water, the emulsifier prevents from occurring phase separation of the hydrogen-containing composition. The emulsifier has a weight ratio of component (a) to component (b) of 1:20 to 1:5, and preferably 1:13 to 1:7.

In the emulsifier, if the weight ratio of component (b) relative to component (a) is less than 5, side reactions may undesirably take place due to an excess of residual NCO group. In contrast, if the weight ratio thereof exceeds 20, side reactions may occur due to an excess of residual OH group, which undesirably deteriorates the properties.

The use of the emulsifier may prevent phase separation when a large amount of water is used, in addition to the emulsification function.

The emulsifier is preferably added in an amount of 5 to 15 parts by weight based on 100 parts by weight of the prepolymer. If the amount of the emulsifier is less than 5 parts by weight, a phase separation effect may not occur. In contrast, if the amount thereof exceeds 15 parts by weight, an excess of urethane group may be formed, thereby undesirably deteriorating heat resistance and durability.

In step (iii) for preparing the polyurethane elastomer, the prepared prepolymer may be additionally mixed with a polyol, a chain extender, a cross-linking agent, a catalyst, a surfactant, or an antioxidant.

The polyol may be added as necessary, and preferred examples thereof may include the same kind of the polyol used in step (i). The above polyol may include a polyol which is the same as or different from the polyol used in step (i). The above polyol is preferably used in an amount of 0 to 90 parts by weight, and more preferably 0 to 30 parts by weight, based on 100 parts by weight of the prepolymer.

In the case where the polyol is additionally used in step (iii), the degree of crystallization of a soft segment may increase because of interactions between the polyol included in the prepolymer prepared in step (i) and the polyol additionally used in step (iii), thus improving dynamic elastic behavior. However, if the amount of the polyol additionally used in step (iii) exceeds 90 parts by weight based on 100 parts by weight of the prepolymer, the degree of crystallization of a hard segment may rather decrease, undesirably deteriorating durability.

The chain extender may be added as necessary, and may be a $C_{2-10}$ hydrocarbon having a molecular weight of 500 or less with two to four hydroxyl groups, and is preferably used in an amount of 0 to 20 parts by weight, and more preferably 0 to 10 parts by weight, based on 100 parts by weight of the prepolymer.

The catalyst may include an organic metal compound, for example, a tin (II) salt of organic carboxylic acid, such as tin (II) dioctoate, tin (II) dilaurate, dibutyltin diacetate and dibutyltin dilaurate, a tertiary amine, such as tetramethylethylenediamine, N-methylmorpholine, diethylbenzylamine, triethylamine, dimethylcyclohexylamine, diazabicyclooctane, N,N'-dimethylpiperazine, N-methyl,N'-(4-N-dimethylamino)butylpiperazine, N,N,N',N'',N''-pentamethyldiethylenetriamine and so on, an amidine, such as 2,3-dimethyl-3,4,5,6-tetrahydropyrimidine, tris-(dialkylaminoalkyl)-s-hexahydrotriazine, in particular, tris-(N,N-dimethylaminopropyl)-s-hexahydrotriazine, a tetraalkylammonium hydroxide, such as tetramethyl ammonium hydroxide, an alkali metal hydroxide, such as sodium hydroxide, and an alkali metal alcoholate, such as sodium methylate and potassium isopropylate, and an alkali metal salt of a long-chain fatty acid having 10 to 20 carbons and any side OH group, and preferably 2,6-dimethylmorpholine-ethylether and tetramethylethylenediamine.

The catalyst is used in an amount of 0.5 to 3 parts by weight, based on 100 parts by weight of the prepolymer, depending on reactivity.

The surfactant decreases surface tension of the prepared polyurethane foamed body to grow foam, and may prevent breakdown of cells due to instability of foam upon increasing viscosity. Also, the surfactant may increase flowability of foam and chargeability at foaming mold and thus make uniform the density of a product. Preferably, a silicone surfactant may be used.

The surfactant may be used in an amount of 0.3 to 3 parts by weight, preferably 0.5 to 2.5 parts by weight, based on 100 parts by weight of the prepolymer. If the amount of the surfactant is less than 0.3 parts by weight, a non-uniform foamed body may result. In contrast, if the amount thereof exceeds 3 parts by weight, a foamed body may have decreased hardness or may shrink.

The antioxidant is not particularly limited so long as it is typically used in the art, and may include hindered phenol- or hindered arylamine-based antioxidants. The amount of the antioxidant may be 0.01 to 1.0 parts by weight based on 100 parts by weight of the prepolymer.

The foaming may be conducted by foaming the prepolymer blend comprising the prepolymer, water, an emulsifier and the like with a foaming machine.

This foaming process may be carried out at 70 to 99° C., and preferably at 80 to 85° C.

If the foaming temperature is lower than 70° C., viscosity may increase, undesirably deteriorating handleability. In contrast, if the foaming temperature is higher than 99° C., it is not easy to handle the prepolymer blend due to high temperature.

The polyurethane elastomer thus prepared may have a crystalline superstructure. Such a crystalline superstructure enables the formation of giant hard segment crystals and thus plays an important role in supporting an external load.

A helper spring for bicycles, motorcycles, automobile suspension devices, furnitures or high-vibrating matrixes can be manufactured by using the polyurethane elastomer.

A better understanding of the present invention may be obtained via the following examples which are set forth to illustrate, but are not to be construed as limiting the present invention.

EXAMPLE 1

Naphthalene diisocyanate (NDI) and polycaprolactone glycol (PCL2000) having a number average molecular weight (Mn) of 2,000 as a polyol were used at a molar ratio of 0.3:1 to obtain a prepolymer having 5 wt % of NCO. 5 parts by weight of diisobutyl phthalate as a plasticizer and 20 parts by weight of NDI were added to 100 parts by weight of the prepolymer having 5 wt % of NCO to prepare a prepolymer containing a terminal NCO group having 20% of an allophanate structure relative to the prepolymer, which was then mixed with 85 parts by weight of water, 2 parts by weight of 2,6-dimethylmorpholineethylether as a catalyst, 1.0 part by weight of a silicone surfactant as a surfactant, 0.2 parts by weight of butylated hydroxytoluene as an antioxidant, and 15 parts by weight of a mixture comprising toluene diisocyanate and 1,4-butanediol at a weight ratio of 1:13 as an emulsifier to obtain a prepolymer blend.

An additional amount of naphthalene diisocyanate may be used in an amount of 1 to 40 parts by weight, preferably 2 to 35 parts by weight, and more preferably 5 to 25 parts by weight, based on 100 parts by weight of the naphthalene diisocyanate used in step (i).

The presence of the allophanate peak in the prepared prepolymer was observed by using FT-IR (NICOLET 380, available from Thermo Electron Corporation (USA)), and the amount of the allophanate was determined via peak segmentation.

The prepolymer blend was foamed at 80° C. by using a low-pressure foaming machine to prepare a microcellular polyurethane elastomer.

EXAMPLE 2

A microcellular polyurethane elastomer was prepared in the same manner as in Example 1, with the exception that 15 parts by weight of a mixture comprising toluene diisocyanate and 1,3-propanediol at a weight ratio of 1:13 was used as the emulsifier.

EXAMPLE 3

A microcellular polyurethane elastomer was prepared in the same manner as in Example 1, with the exception that the amount of the emulsifier was changed to 10 parts by weight.

EXAMPLE 4

A microcellular polyurethane elastomer was prepared in the same manner as in Example 1, with the exception that 15 parts by weight of a mixture comprising toluene diisocyanate and 1,4-butanediol at a weight ratio of 1:7 was used as the emulsifier.

COMPARATIVE EXAMPLE 1

A polyurethane elastomer was prepared in the same manner as in Example 1, with the exception that a plasticizer and an additional amount of NDI were not added to prepare a prepolymer having no allophanate structure.

COMPARATIVE EXAMPLE 2

A polyurethane elastomer was prepared in the same manner as in Example 1, with the exception that 5 parts by weight of a plasticizer and 40 parts by weight of NDI were added to prepare a prepolymer having 40% of an allophanate structure relative to the prepolymer.

COMPARATIVE EXAMPLE 3

Naphthalene diisocyanate (NDI) and polycaprolactone glycol (PCL2000) having a number average molecular weight (Mn) of 2,000 as a polyol were used at a molar ratio of 0.3:1 to prepare a prepolymer having 5 wt % of NCO. 0.5 parts by weight of water, 10 parts by weight of 1,4-butanediol as a chain extender, 2 parts by weight of tetramethylethylenediamine as a catalyst, 1.0 parts by weight of a silicone surfactant as a surfactant, and 0.2 parts by weight of butylated hydroxytoluene as an antioxidant were added to 100 parts by weight of the prepolymer having 5 wt % of NCO to obtain a prepolymer blend.

The prepolymer blend thus obtained was foamed at 100° C. by using a low-pressure foaming machine to prepare a polyurethane elastomer.

COMPARATIVE EXAMPLE 4

A polyurethane elastomer was prepared in the same manner as in Comparative Example 3, with the exception that 10 parts by weight of water was used to obtain the prepolymer blend.

COMPARATIVE EXAMPLE 5

A polyurethane elastomer was prepared in the same manner as in Example 1, with the exception that 100 parts by weight of 1,4-butanediol was used as a chain extender and water was not added to obtain the prepolymer blend.

TEST EXAMPLE

The shelf life of the prepolymers of the examples prepared in accordance with the present invention, the hardness, fracture tensile strength, fracture elongation and rate of change in thickness of the polyurethane elastomers obtained in the examples and comparative examples, and the durability of helper spring samples for automobile suspension devices manufactured by using the above polyurethane elastomers were evaluated as follows.

(1) Shelf Life of Prepolymer

While the prepolymer of Example 1 was subdivided into predetermined amounts and stored in an oven at 85° C., the shelf life and viscosity of the prepolymer were determined in accordance with methods of measuring NCO % and viscosity at intervals of 24 hr. The viscosity was measured by using ASTM D445-83 and ASTM D792-91. The results are shown in Table 1 below.

TABLE 1

| Time (hr) | Viscosity (Cps) | NCO % |
|---|---|---|
| 24 | 1040 | 5.0 |
| 48 | 1024 | 5.0 |
| 72 | 1194 | 5.0 |
| 96 | 1256 | 5.0 |
| 120 | 1324 | 4.9 |
| 144 | 1382 | 4.9 |
| 168 | 1893 | 4.6 |

As is apparent from Table 1, according to the method of the invention, the increase of viscosity was suppressed by up to 144 hr in the prepolymers containing an isocyanate (NCO) group obtained by reacting naphthalene diisocyanate with a polyol. Therefore, upon preparation of the polyurethane elastomers, there is no need to perform high-temperature operation caused by an increase in viscosity, thereby making it easy to handle the prepolymers.

(2) Hardness

A polyurethane elastomer was sufficiently hardened at 80 to 99° C. for 48 hrs and then cooled to room temperature. Thereafter, the hardness thereof was measured with Shore C.

(3) Fracture Tensile Strength

This strength was measured according to ASTM D 3574 and was determined as an average of three measurements on the same sample.

(4) Fracture Elongation

This elongation was measured according to ASTM D 3574 and was determined as an average of three measurements on the same sample.

(5) Rate of Change in Thickness (ΔH, %)

According to the following Equation 1, the height ($H_t$) of a sample after durability test relative to the height ($H_0$) of a sample before durability test was measured and expressed in percentage.

$$\Delta H = ((\Delta H_O - \Delta H_t)/\Delta H_0) \times 100 \quad \text{[Equation 1]}$$

(6) Durability of Helper Spring Sample for Automobile Suspension Device

Helper spring samples for automobile suspension devices manufactured by using the polyurethane elastomers obtained in the examples and comparative examples were compressed under conditions of 5 kN×2 Hz×500,000 times, after which whether external cracking was present was evaluated. The case where external cracking did not occur was indicated as ⊚, the case where the cracking occurred was indicated as ×, and the case where the cracking did not occur but the rate of change in thickness exceeded 30% was indicated as Δ.

Table 2 below shows the results of hardness, fracture tensile strength, fracture elongation, and rate of change in thickness of the polyurethane elastomers obtained in the examples and comparative examples, and durability of the helper spring samples for automobile suspension devices manufactured by using the polyurethane elastomers.

TABLE 2

| | Hardness (Shore C type) | Fracture tensile strength (kg/cm$^2$) | Fracture elongation (%) | Rate of change in thickness (ΔH, %) | Durability |
|---|---|---|---|---|---|
| Example 1 | 75 | 55 | 420 | 21 | ⊚ |
| Example 2 | 73 | 53 | 435 | 25 | ⊚ |
| Example 3 | 75 | 51 | 428 | 23 | ⊚ |
| Example 4 | 76 | 56 | 415 | 20 | ⊚ |
| Comparative Example 1 | 74 | 48 | 400 | 32 | Δ |
| Comparative Example 2 | 76 | 50 | 320 | 30 | Δ |
| Comparative Example 3 | 60 | 38 | 310 | — | X |
| Comparative Example 4 | 69 | 41 | 276 | — | X |
| Comparative Example 5 | 72 | 49 | 254 | — | X |

As is apparent from Table 2, the microcellular polyurethane elastomers prepared by the method of the invention were superior in hardness, fracture tensile strength, fracture elongation, and rate of change in thickness, compared to the polyurethane elastomers of Comparative Examples 1 to 5.

In Comparative Examples 1 and 2, the allophanate structure was not formed, or its amount fell outside the preferred range, and thus the rate of change in thickness before and after durability test increased, undesirably deteriorating durability.

In Comparative Example 3, since a smaller amount of water was used to obtain the prepolymer blend, compared to Example 1, fracture strength and fracture elongation were inferior to those of Example 1.

In Comparative Example 4, as a larger amount of water was used, compared to Comparative Example 1, and the surfactant was used but the emulsifier was not used, phase separation of the hydrogen-containing composition occurred, thereby resulting in poor hardness, fracture tensile strength, fracture elongation, and durability of the polyurethane elastomer.

In Comparative Example 5, the use of 100 parts by weight of 1,4-butanediol as the chain extender resulted in fracture, thereby undesirably deteriorating durability. This is considered to be because urethane bonds are formed and then broken at about 100 to 120° C., when 1,4-butanediol is used as the chain extender during preparation of the polyurethane elastomer.

Therefore, the helper spring samples for automobile suspension devices manufactured by using the microcellular polyurethane elastomers obtained in accordance with the method of the invention can be seen to exhibit superior durability, compared to the helper spring samples for automobile suspension devices manufactured by using the polyurethane elastomers of Comparative Examples 1 to 5.

What is claimed is:

1. A method of preparing a microcellular polyurethane elastomer, comprising:
   (i) reacting naphthalene diisocyanate (NDI) with a polyol to obtain a prepolymer containing an isocyanate (NCO) group;
   (ii) adding a plasticizer and an additional amount of naphthalene diisocyanate to the prepolymer prepared in step (i) to introduce into the prepolymer a terminal free isocyanate (NCO) group having 5 to 30 wt % of an allophanate structure, based on the weight of the prepolymer; and
   (iii) mixing the prepolymer having a terminal free isocyanate (NCO) group obtained in step (ii) with water and an emulsifier to obtain a prepolymer blend and then foaming the prepolymer blend to prepare a polyurethane elastomer, and wherein the emulsifier is prepared from a mixture of (a) a compound selected from the group consisting of 2,4-toluene diisocyanate, 2,6-toluene diisocyanate, 2,4-diphenylmethane diisocyanate, 4,4'-diphenylmethane diisocyanate, hexamethylene diisocyanate, 1,4'-cyclohexane diisocyanate and mixtures thereof, and (b) a one or more $C_{2-10}$ hydrocarbons having a molecular weight of 500 or less and which is substituted with two to four hydroxyl groups.

2. The method of claim 1, wherein a molar ratio of the naphthalene diisocyanate to the polyol is 0.2 to 0.6:1.

3. The method of claim 1, wherein the polyol has a number average molecular weight (Mn) of 500 to 5,000.

4. The method of claim 1, wherein the polyol is selected from the group consisting of polyester glycol, polyether glycol, and polycarbonate glycol.

5. The method of claim 1, wherein in step (iii), water and the emulsifier are added in amounts of 20 to 95 parts by weight and 5 to 15 parts by weight, respectively, based on 100 parts by weight of the prepolymer having a terminal free isocyanate (NCO) group.

6. The method of claim 1, wherein component (a) to component (b) are provided in a weight ratio of 1:20 to 1:5 to prepare the emulsifier.

7. The method of claim 1, wherein the isocyanate content of the prepolymer containing an isocyanate group (NCO) is 2 to 15 wt %.

8. The method of claim 1, wherein in step (iii), the prepolymer having a terminal free isocyanate (NCO) group is additionally mixed with a second polyol, a chain extender, a cross-linking agent, a catalyst, a surfactant, or an antioxidant.

9. The method of claim 8, wherein in step (iii), the prepolymer having a terminal free isocanate (NCO) group is mixed with the second polyol which is polyester glycol, polyether glycol, or polycarbonate glycol, and the chain extender which is a $C_{2-10}$ hydrocarbon having a molecular weight of 500 or less and which is substituted with two to four hydroxyl groups.

10. A microcellular polyurethane elastomer having a crystalline superstructure, prepared by the method of claim 1.

11. A helper spring for a bicycle, a motorcycle, an automobile suspension device, furniture or a high-vibrating matrix, comprising the microcellular polyurethane elastomer of claim 10.

12. The method of claim 4, wherein the polyol is polycaprolactone glycol.

13. The method of claim 8, wherein in step (iii), the prepolymer having a terminal free isocyanate (NCO) group is mixed with the second polyol and wherein the second polyol is polycaprolactone glycol.

14. The method of claim 1, wherein in step (iii), the prepolymer having a terminal free isocyanate (NCO) group is additionally mixed with a chain extender comprising a $C_{2-10}$ hydrocarbon having a molecular weight of 500 or less and which is substituted with two to four hydroxyl groups.

15. The method of claim 1, wherein in step (iii), the prepolymer having a terminal free isocyanate (NCO) group is additionally mixed with a cross-linking agent.

16. The method of claim 1, wherein in step (iii), the prepolymer having a terminal free isocyanate (NCO) group is additionally mixed with a catalyst.

17. The method of claim 1, wherein in step (iii), the prepolymer having a terminal free isocyanate (NCO) group is additionally mixed with a surfactant.

18. The method of claim 1, wherein in step (iii), the prepolymer having a terminal free isocyanate (NCO) group is additionally mixed with an antioxidant.

19. A method of preparing a microcellular polyurethane elastomer, comprising:
   (i) reacting naphthalene diisocyanate (NDI) with a polyol to obtain a prepolymer containing an isocyanate (NCO) group;
   (ii) adding a plasticizer and an additional amount of naphthalene diisocyanate to the prepolymer prepared in step (i) to introduce into the prepolymer a terminal free isocyanate (NCO) group having 5 to 30 wt % of an allophanate structure, based on the weight of the prepolymer; and
   (iii) mixing the prepolymer having a terminal free isocyanate (NCO) group obtained in step (ii) with water and an emulsifier to obtain a prepolymer blend and then foaming the prepolymer blend to prepare a polyurethane elastomer, and wherein in step (iii), water and the emulsifier are added in amounts of 20 to 95 parts by weight and 5 to 15 parts by weight, respectively, based on 100 parts by weight of the prepolymer having a terminal free isocyanate (NCO) group.

* * * * *

UNITED STATES PATENT AND TRADEMARK OFFICE
CERTIFICATE OF CORRECTION

| | | |
|---|---|---|
| PATENT NO. | : 9,745,437 B2 | Page 1 of 1 |
| APPLICATION NO. | : 14/369011 | |
| DATED | : August 29, 2017 | |
| INVENTOR(S) | : Yang et al. | |

It is certified that error appears in the above-identified patent and that said Letters Patent is hereby corrected as shown below:

In the Claims

<u>Column 9,</u>
Line 33, "(b) a one or more" should read --(b) one or more--;
Line 48, "(a) to" should read --(a) and--.

<u>Column 10,</u>
Line 2, "isocanate" should read --isocyanate--.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*